(12) United States Patent  (10) Patent No.: US 9,146,841 B2
Pannem et al.  (45) Date of Patent: Sep. 29, 2015

(54) PROXY SERVER ASSISTED PRODUCT TESTING

(71) Applicant: VMware, Inc., Palo Alto, CA (US)

(72) Inventors: Hemanth Kumar Pannem, Bangalore (IN); Amrainder Singh, Bangalore (IN); Diwakar Prabhakaran, Bangalore (IN); Jusvinder Singh, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 77 days.

(21) Appl. No.: 13/832,821

(22) Filed: Mar. 15, 2013

(65) Prior Publication Data

US 2014/0282420 A1  Sep. 18, 2014

(51) Int. Cl.
*G06F 9/44* (2006.01)
*G06F 11/36* (2006.01)
*G06F 9/445* (2006.01)

(52) U.S. Cl.
CPC ........ *G06F 11/3672* (2013.01); *G06F 9/44589* (2013.01)

(58) Field of Classification Search
None
See application file for complete search history.

(56) References Cited

U.S. PATENT DOCUMENTS

| | | | |
|---|---|---|---|
| 6,915,307 B1* | 7/2005 | Mattis et al. | 1/1 |
| 2003/0028515 A1* | 2/2003 | Nishikado et al. | 707/1 |
| 2007/0055958 A1* | 3/2007 | Birenheide et al. | 717/124 |
| 2008/0109680 A1* | 5/2008 | Kodaka et al. | 714/38 |
| 2009/0055274 A1* | 2/2009 | Calo et al. | 705/14 |
| 2013/0041936 A1* | 2/2013 | Ohtake et al. | 709/203 |

OTHER PUBLICATIONS

Wang, "A Survey of Web Caching Schemes for the Internet", in ACM SIGCOMM Computer Communication Review, vol. 29 Issue 5, Oct. 1999, pp. 36-46.*
Amalfitano et al., "A GUI Crawling-based technique for Android Mobile Application Testing", in IEEE Fourth Conference on Software Testing, Verification and Validation Workshops (ICSTW), Mar. 21-25, 2011, pp. 252-261.*

* cited by examiner

*Primary Examiner* — Wei Zhen
*Assistant Examiner* — Timothy Duncan

(57) ABSTRACT

A method is provided for a proxy server to assist in the testing of a product. The method includes receiving, from the product, a first request and passing the first request to a server, receiving, from the server, a first response to the first request and passing the first response to the product, recording the first request and the first response, generating one or more second responses from one or more simulated servers based on the first request and the first response, intercepting a second request from the product, in response to the second request, matching the second request to a second response, and sending the second response to the product.

27 Claims, 6 Drawing Sheets

```
<TAB>
    <MetaData>
        <ServerBaseUrl>http://ip/api</ServerBaseUrl>
        <ServerVersion>2.0</ServerVersion>
        <DefaultUrlParameters>
            <Param name="version" value="2.0"/>
            ...
        </DefaultUrlParameters>
    </MetaData>
</TAB>
```

FIG. 2

```
<TAB>
    <API url ="<relative path with respect to base Url>" >
    <Request>
        <Request XML>
    </Request>
    <Response>
        <Response XML>
    </Response>
</TAB>
```

FIG. 3

Metadata:

```
<TAB>
    <MetaData>
        <ServerBaseUrl>http://1.2.3.4/api</ServerBaseUrl>
        <ServerVersion>2.0</ServerVersion>
        <DefaultUrlParameters>
            <Param name="version" value="2.0"/>
            ...
        </DefaultUrlParameters>
    </MetaData>
</TAB>
```

API details:

URL: /hierarchies

Request: <NA>

Response:

```
<Response status="success" isValidLicense="true">
    <Hierarchies>
        <Hierarchy id="1174">
            <Name>Test_Hierarchy</Name>
            <Description>Test Hierarchy</Description>
        </Hierarchy>
        <Hierarchy id="1172">
            <Name>Test_Hierarchy1</Name>
            <Description>Test Hierarchy</Description>
        </Hierarchy>
    </Hierarchies>
</Response>
```

FIG. 5

Server1 Metadata:

```
<TAB>
    <MetaData>
        <ServerBaseUrl>http://1.2.3.4/api</ServerBaseUrl>
        <ServerVersion>2.0</ServerVersion>
        <DefaultUrlParameters>
            <Param name="version" value="2.0"/>
            ...
        </DefaultUrlParameters>
    </MetaData>
</TAB>
```

Server2 Metadata:

```
<TAB>
    <MetaData>
        <ServerBaseUrl>http://5.6.7.8/api</ServerBaseUrl>
        <ServerVersion>2.0</ServerVersion>
        <DefaultUrlParameters>
            <Param name="version" value="2.0"/>
            ...
        </DefaultUrlParameters>
    </MetaData>
</TAB>
```

FIG. 6

PROXY SERVER ASSISTED PRODUCT TESTING

BACKGROUND

Unless otherwise indicated herein, the approaches described in this section are not prior art to the claims in this application and are not admitted to be prior art by inclusion in this section.

Software testing determines if a software application meets its design and behaves as intended. The software application may be tested in individual units of code and as an integrated unit. Test cases are written and executed to determine if the software application is working correctly under a variety of conditions.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are therefore not to be considered limiting of its scope, the disclosure will be described with additional specificity and detail through use of the accompanying drawings.

In the drawings:

FIG. 2 illustrates a metadata section of a template in one or more examples of the present disclosure;

FIG. 3 illustrates an application programming interface (API) details section of a template in one or more examples of the present disclosure;

FIG. 5 illustrates a template for a request for a resource on a server such as Hierarchy using "Get Hierarchies" command, in one or more examples of the present disclosure;

FIG. 6 illustrates a customized metadata section of the template for the request of the "Get Hierarchies" command in one or more examples of the present disclosure.

DETAILED DESCRIPTION

A programmer makes certain assumptions while writing test cases that depend on communication between the software product being tested and other software products, such as servers. These assumptions may include, among other things, hardcoded server Internet Protocol (IP) addresses, expected requests/responses codes or the location and availability of test resources files. When the tests are run, the servers may not be running or data in the servers may not be present. This causes test failures that need the programmer's time to investigate. These test failures are mostly false alarms, which either forces the programmer to change the test cases or configuration files.

There are mockup frameworks that allow the programmer to avoid these issues. Through these mockup frameworks, all the server objects are mocked up to simulate communication between the product and the servers. In this approach, there is considerable manual effort from the programmer to write code to mock up the objects. If there are any new server objects to be mocked up or any changes to existing mocked up objects, the programmer needs to write significant code to make these changes. There is also effort needed to mock multiple servers of the same or different types in communication with the product.

In one or more examples of the present disclosure, a test automation booster (TAB) framework is provided to test a product that communicates with one or more servers. The TAB framework includes a TAB proxy server that records communication between the product and one server and uses the recorded communication to simulate one or more servers of the same type. In one example, the TAB proxy server passes a request from the product to the server, and the TAB proxy server returns a response to the request from the server to the product. The TAB proxy server records the request and the response in a template. The TAB proxy server creates instances of the template in volatile memory (e.g., system memory), hereafter referred to "objects," to simulate one or more servers. When the product sends the same request to a simulated server, the TAB proxy server finds a matching object and responds with the recorded response of that simulated server. The process may be repeated for additional types of requests from the product to the server. The process may also be applied to requests from the product to additional types of servers. Thus the TAB framework eases and boosts the writing of test cases, which directly enhances code coverage to produce a well-tested product.

Figure 1:
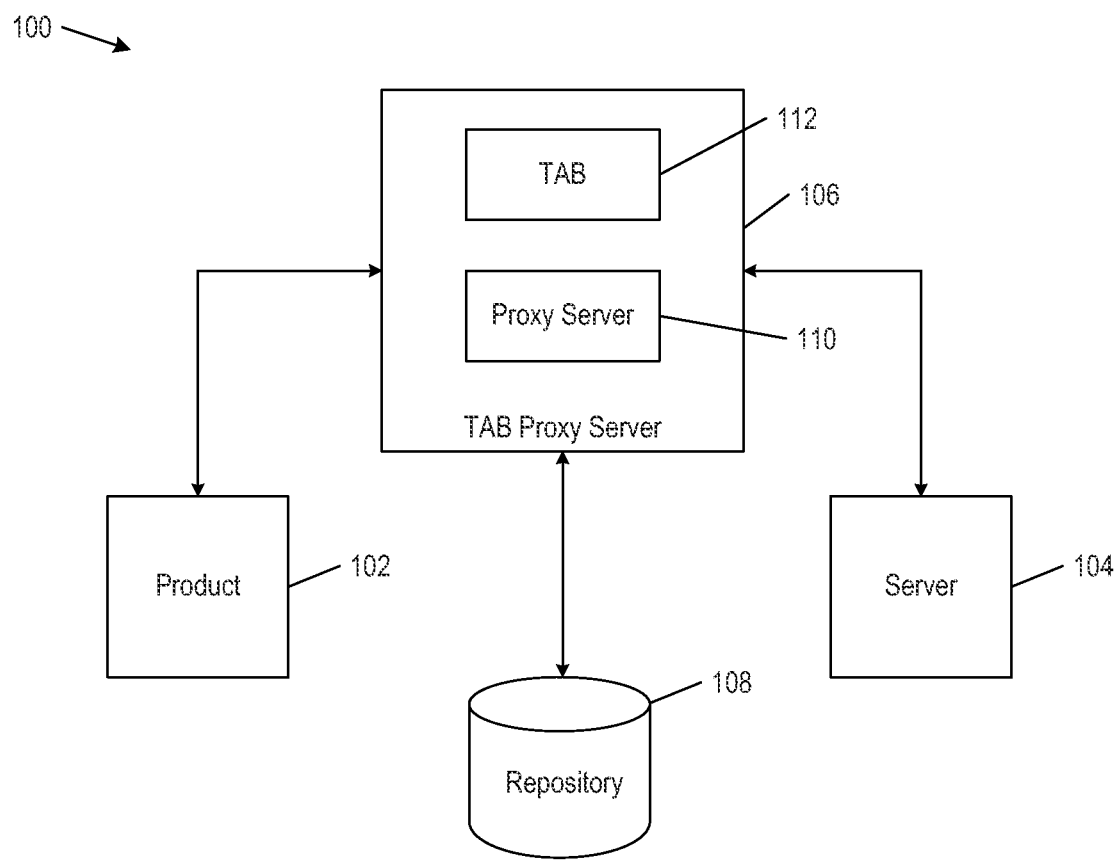
FIG. 1 is a block diagram of a system for implementing a test automation booster (TAB) framework in one or more examples of the present disclosure.

FIG. 1 shows a block diagram of a system 100 for implementing the TAB framework in one or more examples of the present disclosure. System 100 includes a product 102, a server 104, a TAB proxy server 106 between product 102 and server 104, and a repository 108 coupled to proxy server 106. TAB proxy server 106 may be implemented with a proxy server 110 and a TAB software application 112. Product 102 and proxy server 110 are configured so proxy server 110 is an intermediary between product 102 and server 104. Alternatively TAB proxy server 106 is a proxy server with built-in TAB functionalities. Product 102, server 104, TAB proxy server 106, and repository 108 may be implemented on physical machines, virtual machines, or a combination of physical and virtual machines. For example, product 102 may be VMware vCloud Integration Manager, and server 104 may be VMware vCloud Director or VMware Chargeback Manager. Product 102 may communicate with additional types of servers in system 100.

The TAB framework includes a recording phase, an optional customization phase, and a play (or replay) phase. In the recording phase, TAB proxy server 106 records communication between product 102 and server 104 in a template in nonvolatile memory (e.g., repository 108). In one example, proxy server 110 copies TAB software application 112 on the communication between product 102 and server 104, and TAB software application 112 records the communication in a template in repository 108. The communication between product 102 and server 104 is not encoded so TAB proxy application 112 can read and understand the communication. The communication comprises a request from product 102 to server 104 and a response to the requests from server 104 to product 102.

In one example, proxy server 110 is a hypertext transport protocol (HTTP) proxy, the request is part of a HTTP request from the product 102 to proxy server 110 destined for server 104, and the response is part of a HTTP response to the HTTP request from server 104 to proxy server 110. In one example, the request includes a uniform resource locator (URL) having a hostname or an IP address that identifies a server (e.g., server 104), and a path that identifies a specific application programming interface (API) command. The server identifier, also referred to the "server base URL," is a part of the URL including the host name. The API command identifier, also referred to as the "API URL," is the path in the URL.

The template may be in extensible markup language (XML). The template includes a metadata section and an API details section. In the metadata section, TAB software application 112 initially stores information about one server (e.g., server 104), such as its server base URL and API type (e.g., Representational State Transfer (REST) or Simple Object Access Protocol (SOAP) API). In the API details section, proxy server 106 initially stores information about one API command, such as its API URL, the details of the request in XML, and the details of the response in XML. This process may be repeated for additional types of requests and responses between product 102 and server 104, and TAB software application 112 may add each type of request and response to the API details section. The process may also be applied to requests from product 102 to additional types of servers and TAB software application 112 would create a template for each type of server.

One example of the metadata section of a template is provided in FIG. 2.

The metadata section may include additional information about the server when and as needed, including policy based rules as described later. The metadata section can also be changed to specify another server IP address.

One example of the API details section of a template is provided in FIG. 3.

In one example, the template is a file store or a database in repository 108, and the metadata and the API details sections are files in the file store or rows in the database. Examples of the present disclosure are shown using REST API in XML although the present disclosure may be implemented in other protocols including SOAP.

In the optional customization phase, the template is customized to simulate multiple servers and also the responses in the play phase. To simulate multiple servers, the programmer may manually add additional metadata sections by duplicating an existing metadata section but assign unique host names or IP addresses to their server base URLs. Alternatively this can be automatically achieved via rules. For example, the programmer may add a rule that specify a number of simulated servers and a range of IP addresses, and TAB software application 112 can automatically create objects that represent simulated servers based on this rule.

The metadata section can also include policy-based rules to simulate response for each of the simulated server. For example, the programmer may add a rule to give an error response after three (3) unsuccessful attempts to simulate account lockouts or modify response based on some parameters of the request for an API.

When customization is not needed, the TAB framework performs a record-replay function for a single server.

In the play (or replay) phase, product 102 responds to test cases and interacts with TAB proxy server 106. Also in this phase, TAB proxy server 106 creates objects from the template based on the customization of the template. An object is an instance of a template in memory that simulates a single server (i.e., it has a unique host name or IP address). TAB proxy server 106 receives each request before server 104 and processes it to determine if there is a matching object. A request matches an object when they have the same server identifier and the same API command identifier (e.g., when they have the same server base URL and the same API URL). When a matching object is found, TAB proxy server 106 sends the recorded response in the matching object to product 102 without redirecting the request to server 104.

In one example, TAB software application 112 creates an object for each simulated server in memory. As described before, TAB software application 112 may generate the objects based on multiple metadata sections or based on a rule to create multiple objects based on one meta data section. Note that when no customization is involved, the lone object and the template appear the same. Proxy server 110 receives the request, forwards it to TAB software application 112, and waits for TAB software application 112 to determine if there is a matching object to the request. When there is a matching object to the request, TAB software application 112 sends the recorded response in the matching object to product 102 via proxy server 110. Note that TAB software application 112 also applies any policy-based rules in generating the response to the request.

Figure 4:
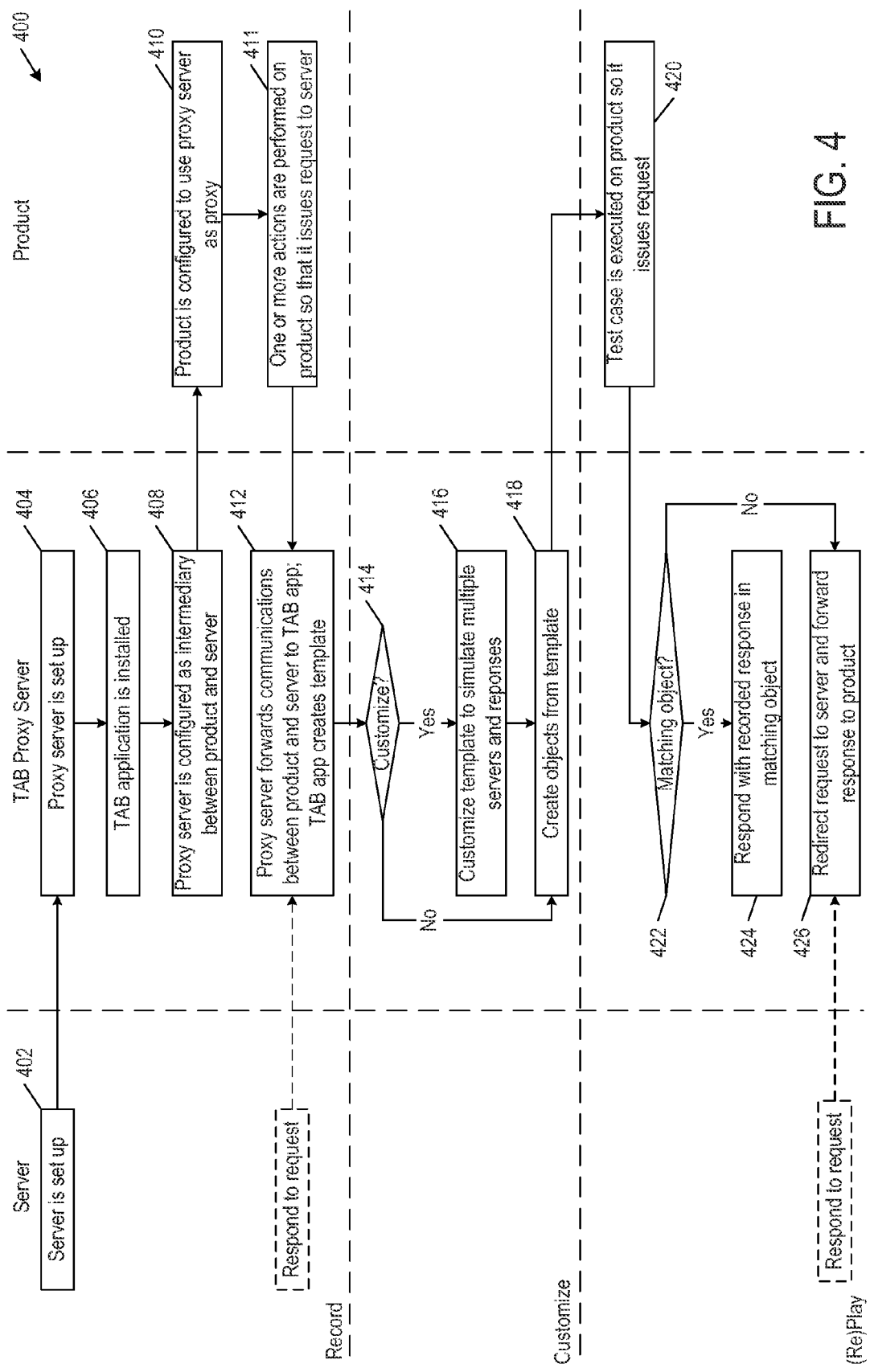
FIG. 4 is a flowchart of a method for implementing the TAB framework in one or more examples of the present disclosure.

FIG. 4 is a swimlane flowchart of a method 400 for implementing the TAB framework in one or more examples of the present disclosure. Method 400 may include one or more operations, functions, or actions illustrated by one or more blocks. Although the blocks are illustrated in sequential orders, these blocks may also be performed in parallel, and/or in a different order than those described herein. Also, the various blocks may be combined into fewer blocks, divided into additional blocks, and/or eliminated based upon the desired implementation. The swimlane flowchart shows the blocks of product 102, server 104, and TAB proxy server 106 in separate lanes.

For simplicity, method 400 is demonstrated for one type of request, one type of server, and one test case. However it is understood that method 400 may be applied to additional types of requests, additional types of servers, and additional test cases. Blocks 402 to 412 represent the record phase, blocks 414 to 418 represent the customization phase, and blocks 420 to 426 represent the (re)play phase of the TAB framework. Method 400 may begin in block 402.

In block 402, which starts the recording phase, server 104 is set up on a physical or virtual machine. Server 104 may be manually set up by a programmer or automatically set up by software. Block 402 is followed by block 404.

In block 404, proxy server 110 is set up on a physical or virtual machine. Proxy server 110 may be manually or automatically set up. Block 404 may be followed by block 406.

In block 406, TAB software application 112 is installed to work with proxy server 110 for implementing the TAB framework. TAB software application 112 may be installed on the same or different machine as proxy server 110. TAB software application 112 may be manually or automatically installed. Block 406 may be followed by block 408.

In block 408, proxy server 110 is configured as an intermediary between product 102 and server 104. Proxy server 110 may be manually or automatically configured. Block 408 may be followed by block 410.

In block 410, product 102 is configured to use proxy server 110 as a proxy (e.g., an HTTP proxy). Product 102 may be manually or automatically configured. Block 410 may be followed by block 411.

In block 411, one or more actions are performed on product 102 so that it issues a request to server 104. The one or more actions may be manually or automatically performed. Block 411 may be followed by block 412.

In block 412, proxy server 110 forwards the communication between product 102 and server 104 to TAB software application 112, and TAB software application 112 creates a template in repository 108. For example, a template for a request of a "Get Hierarchies" command is shown in FIG. 5. Block 412 may be followed by block 414.

In block 414, which starts the customization phase, a determination is made as to whether or not the template should be customized. For example, the template may be customized to create objects that represent multiple simulated servers in a test case. For example, the template may be customized to include policy based rules to simulate responses for each simulated server in a test case. This determination may be manually or automatically performed. If the template should be customized, block 414 may be followed by block 416. Otherwise block 414 may be followed by block 420.

In block 416, the template is customized. As described above, a programmer may customize the template to simulate multiple servers in the play phase and also the responses. For example, the metadata section of the template for the request of the "Get Hierarchies" command is customized as shown in FIG. 6. Block 416 may be followed by block 418.

In block 418, TAB application software generates objects from the template. Block 418 may be followed by block 420.

In block 420, which begins the (re) play phase, a test case is executed and product 102 responds to the test case by issuing a request to a server via proxy server 110, which forwards the request to TAB application software 112. The test case may be manually or automatically executed. Block 420 may be followed by block 422.

In block 422, TAB application software 112 determines if there is a matching object for the request. For example, TAB application software 112 determines the request has the same server base URL and the same API URL as an object. If so, block 422 may be followed by block 424. Otherwise block 422 may be followed by block 426.

In block 424, TAB application software 112 sends the recorded response in the matching object to product 102 without redirecting the request to an actual server (e.g., sever 104). Block 424 may optionally loop back to block 418 to process additional requests or method 400 may end once the test case terminate.

In block 426, proxy server 106 redirects the request to an actual server, such as server 104. When server 104 responds with a response, proxy server 106 forwards the response to product 102. Proxy server 106 may record and update the template with the new request and response, and update the existing objects or replacement with new objects created from the updated template to handle this new request and response in the future. Block 426 may optionally loop back to block 418 to process additional requests or method 400 may end once the test cases terminate.

Figure 7:
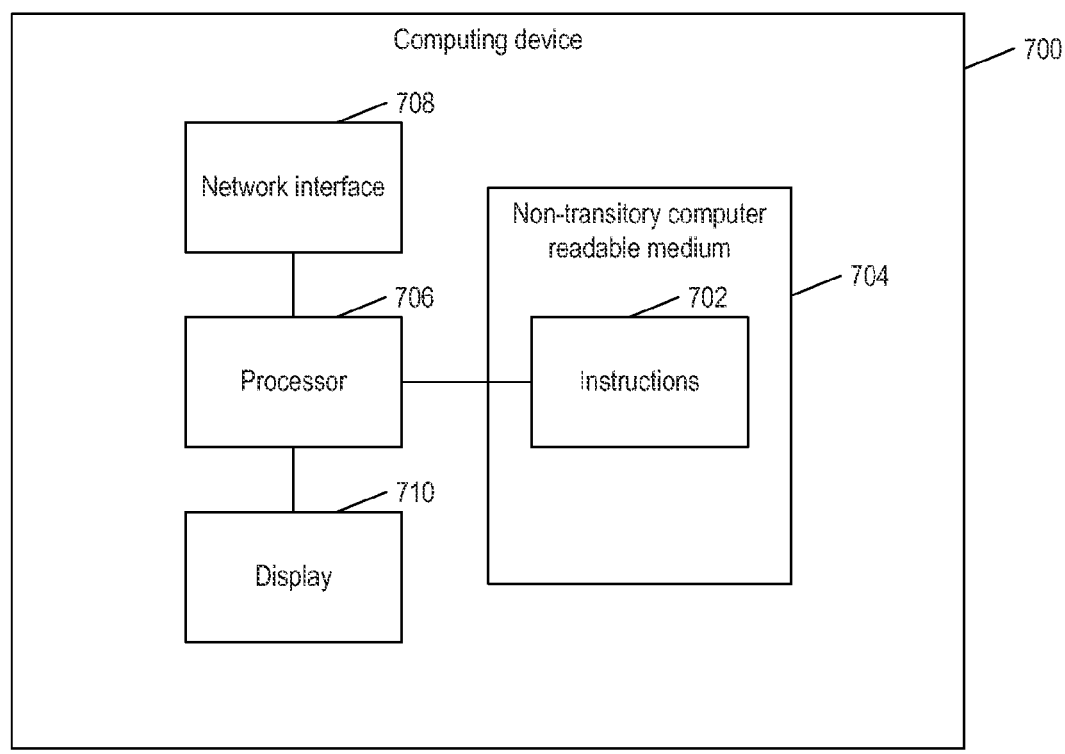
FIG. 7 is a block diagram of a computing device for implementing a proxy server of FIG. 1 in one or more examples of the present disclosure.

FIG. 7 is a block diagram of a computing device 700 for implementing proxy server 106 (FIG. 1) in one or more examples of the present disclosure. TAB proxy server 106 is implemented with processor executable instructions 702 stored in a non-transitory computer readable medium 704, such as a hard disk drive, a solid state drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion. A processor 706 executes instructions 702 to provide the described features and functionalities, which may be implemented by sending instructions to a network interface 708 or a display 710.

The various embodiments described herein may be practiced with other computer system configurations including hand-held devices, microprocessor systems, microprocessor-based or programmable consumer electronics, minicomputers, mainframe computers, and the like.

With TAB framework, the programmer would not have any difficulty in using servers as they are captured and mocked automatically. There would not be any problem either in setting up servers as it is just a click of a button to utilize TAB proxy server 106 to capture a request and a response. The programmer may also generate multiple copies of the servers as well as mock any server. This reduces the challenges in setting up multiple servers such as Lightweight Directory Access Protocol (LDAP) server, VMware vCenter Server, and VMware vCloud Director. The programmer's effort in coding for test cases is significantly reduced as the TAB framework does the mocking automatically. As the TAB framework replays the mocked objects, the test case execution time is significantly reduced. This could be used for pre-flight testing before check-in so as to test every change.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. A method for a proxy server to assist in product testing, the method comprising:
   receiving, from a product under testing, a first request and passing the first request to a server;
   receiving, from the server, a first response to the first request and passing the first response to the first request to the product;
   recording the first request and the first response as a template;
   customizing the template with information to simulate servers based on the server;
   generating objects representing the simulated servers from the template, the objects comprising second responses based on the first request and the first response;
   intercepting a second request from the product to one of the simulated servers;
   in response to the second request, matching the second request to one of the objects representing the simulated server; and
   sending the second response in the object to the product.

2. The method of claim 1, further comprising:
   receiving, from the product, a third request and passing the third request to the server when the third request does not match any of the objects;
   receiving, from the server, a third response to the third request to the product; and
   recording the third request and the third response in the template.

3. The method of claim 1, wherein:
   the template comprises:
      a metadata section comprising a server identifier of the server;
      metadata sections comprising server identifiers of the simulated servers; and
      an application programming interface (API) details section, comprising:
         an API command identifier;
         request details; and
         response details; and each object comprises an instance of the template that represents one simulated server.

4. The method of claim 3, wherein the server identifier includes a hostname or an Internet Protocol (IP) address from a uniform resource locator (URL), and the API command identifier includes a path in the URL.

5. The method of claim 3, wherein the second request matches the object when their server identifiers and API command identifiers in the second request and the object match.

6. The method of claim 1, wherein the proxy server comprises a hypertext transfer protocol (HTTP) proxy server and a test automation booster software application.

7. The method of claim 1, wherein the product generates the first request in response to an action performed on the product.

8. The method of claim 7, wherein the product generates the second request in response to a test case.

9. The method of claim 1, wherein the information comprises metadata sections in the template including server identifiers of the simulated servers or a rule to create the objects based on a metadata section in the template including a server identifier of the server.

10. A system, comprising:
 a product under testing;
 a server;
 a proxy server to assist in the testing of a product, the proxy server being configured to:
  receive, from the product, a first request and passing the first request to the server;
  receive, from the server, a first response to the first request and passing the first response to the first request to the product;
  record the first request and the first response as a template;
  customize the template with information to simulate servers based on the server;
  generate objects representing the simulated servers from the template, the objects comprising second responses based on the first request and the first response;
  intercept a second request from the product to one of the simulated servers;
  in response to the second request, match the second request to one of the objects representing the simulated server; and
  send the second response in the object to the product.

11. The system of claim 10, wherein the proxy server is configured to:
 receive, from the product, a third request and passing the third request to the server when the third request does not match any of the objects;
 receive, from the server, a third response to the third request to the product; and
 record the third request and the third response in the template.

12. The system of claim 10, wherein the template comprises:
 a metadata section comprising a server identifier of the server;
 metadata sections comprising server identifiers of the simulated servers; and
 an application programming interface (API) details section, comprising:
  an API command identifier;
  request details; and
  response details; and
 each object comprises an instance of the template that represents one simulated server.

13. The system of claim 12, wherein the server identifier includes a hostname or an Internet Protocol (IP) address from a uniform resource locator (URL), and the API command identifier includes a path in the URL.

14. The system of claim 13, wherein the second request matches the object when their server identifiers and API command identifiers in the second request and the object match.

15. The system of claim 10, wherein the proxy server comprises a hypertext transfer protocol (HTTP) proxy server and a test automation booster software application.

16. The system of claim 10, wherein the product generates the first request in response to an action performed on the product.

17. The system of claim 16, wherein the product generates the second request in response to a test case.

18. The system of claim 10, wherein the information comprises metadata sections in the template including server identifiers of the simulated servers or a rule to create the objects based on a metadata section in the template including a server identifier of the server.

19. A non-transitory computer-readable storage medium encoded with computer-executable instructions for a proxy server to assist in product testing, the instructions comprising:
 receiving, from a product under testing, a first request and passing the first request to a server;
 receiving, from the server, a first response to the first request and passing the first response to the first request to the product;
 recording the first request and the first response as a template;
 customizing the template with information to simulate servers based on the server;
 generating objects representing the simulated servers from the template, the objects comprising second responses based on the first request and the first response;
 intercepting a second request from the product to one of the simulated servers;
 in response to the second request, matching the second request to one of the objects representing the simulated server; and
 sending the second response in the object to the product.

20. The non-transitory computer-readable storage medium of claim 19, wherein the instructions further comprise:
 receiving, from the product, a third request and passing the third request to the server when the third request does not match any of the objects;
 receiving, from the server, a third response to the third request to the product; and
 recording the third request and the third response in the template.

21. The non-transitory computer-readable storage medium of claim 19, wherein the template comprises:
 a metadata section comprising a server identifier of the server;
 metadata sections comprising server identifiers of the simulated servers; and
 an application programming interface (API) details section, comprising:
  an API command identifier;
  request details; and
  response details; and
 each object comprises an instance of the template that represents one simulated server.

22. The non-transitory computer-readable storage medium of claim 21, wherein the server identifier includes a hostname or an Internet Protocol (IP) address from a uniform resource locator (URL), and the API command identifier includes a path in the URL.

23. The non-transitory computer-readable storage medium of claim 22, wherein the second request matches the object when their server identifiers and API command identifiers in the second request and the object match.

24. The non-transitory computer-readable storage medium of claim 19, wherein the proxy server comprises a hypertext transfer protocol (HTTP) proxy server and a test automation booster software application.

25. The non-transitory computer-readable storage medium of claim 19, wherein the product generates the first request in response to an action performed on the product.

26. The non-transitory computer-readable storage medium of claim 25, wherein the product generates the second request in response to a test case.

27. The non-transitory computer-readable storage medium of claim 19, wherein the information comprises metadata sections in the template including server identifiers of the simulated servers or a rule to create the objects based on a metadata section in the template including a server identifier of the server.

\* \* \* \* \*